A. LARSEN.
WEIGHING MACHINE.
APPLICATION FILED JUNE 20, 1918.
1,412,184.
Patented Apr. 11, 1922.
5 SHEETS—SHEET 3.
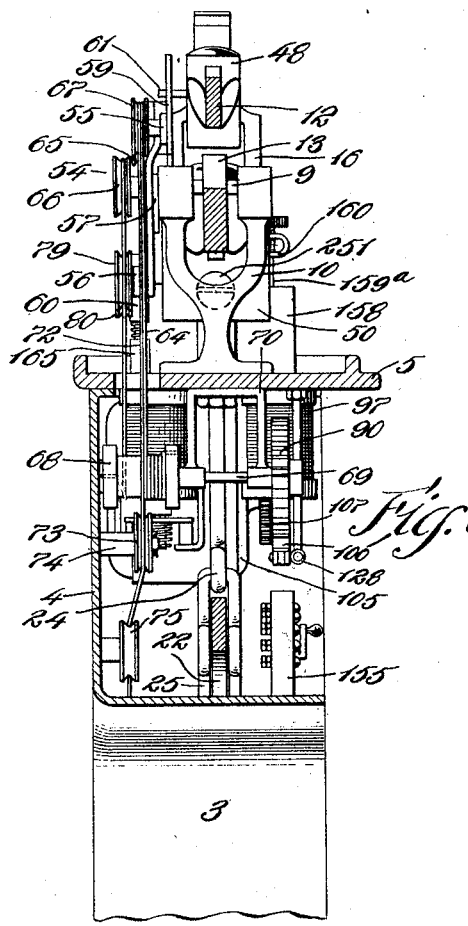
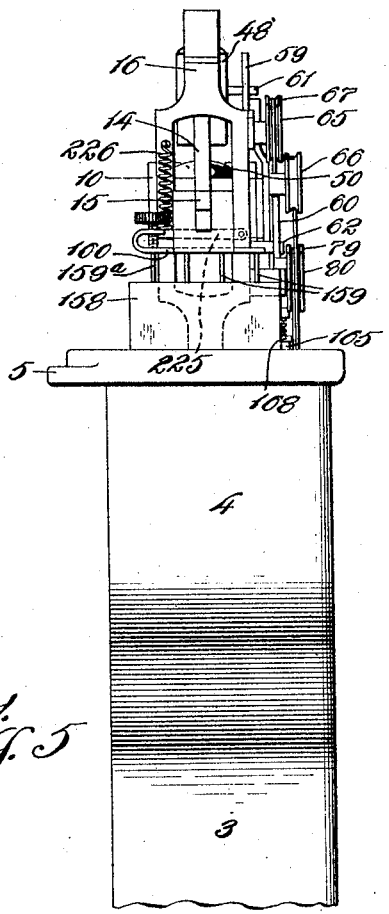
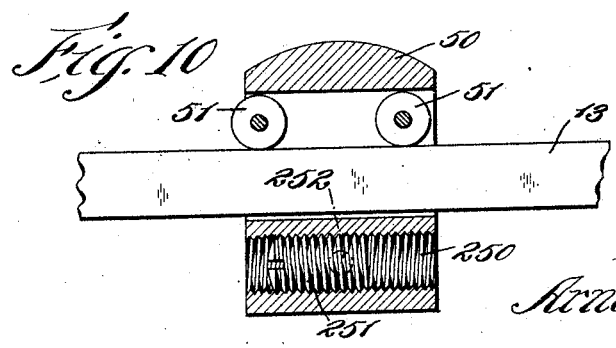

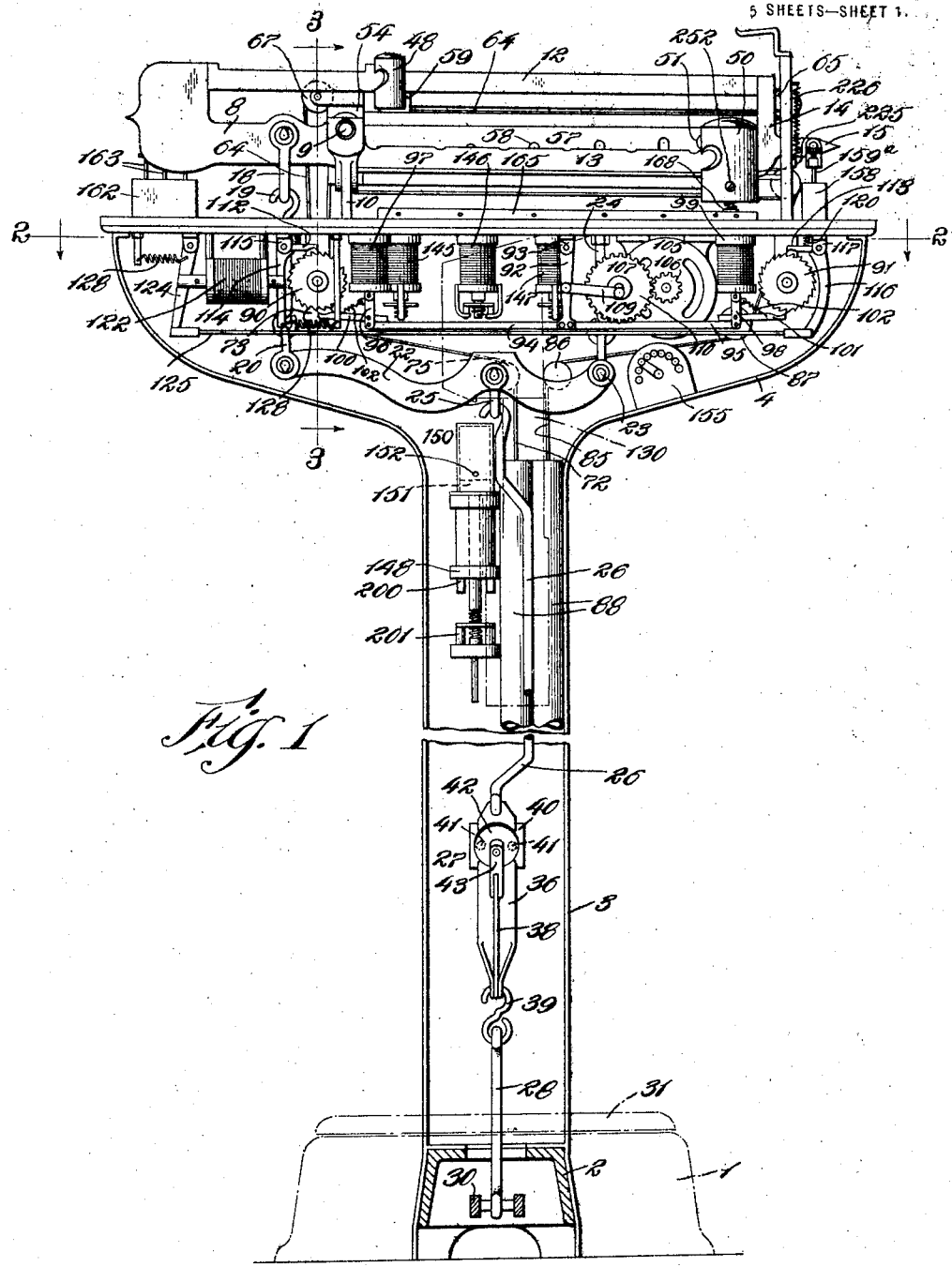

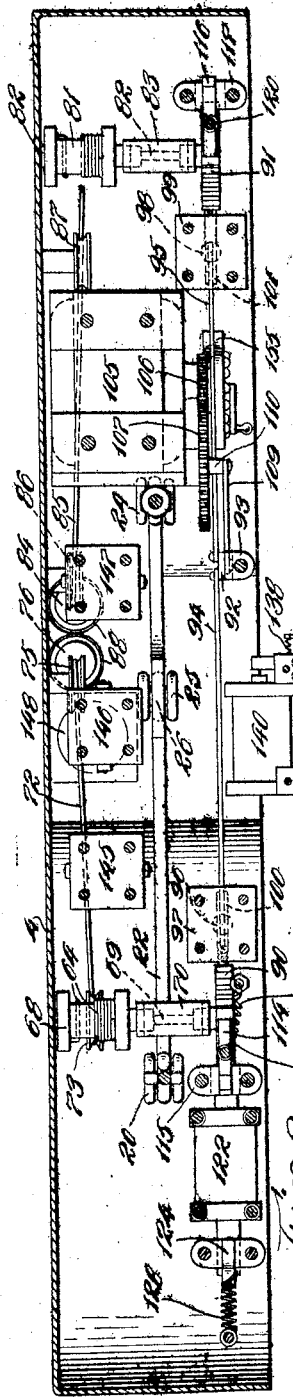

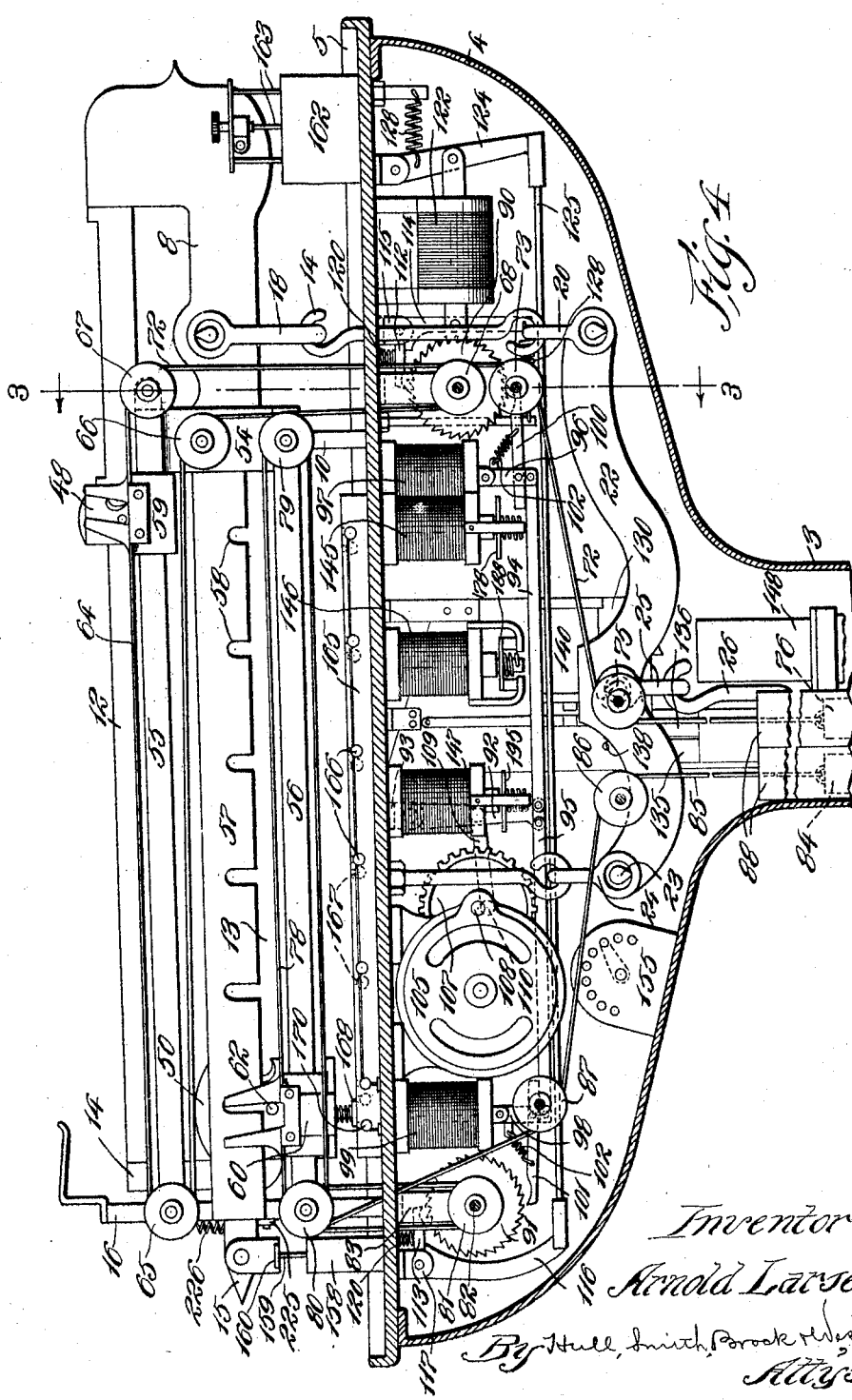

A. LARSEN.
WEIGHING MACHINE.
APPLICATION FILED JUNE 20, 1918.
1,412,184.
Patented Apr. 11, 1922.
5 SHEETS—SHEET 5.
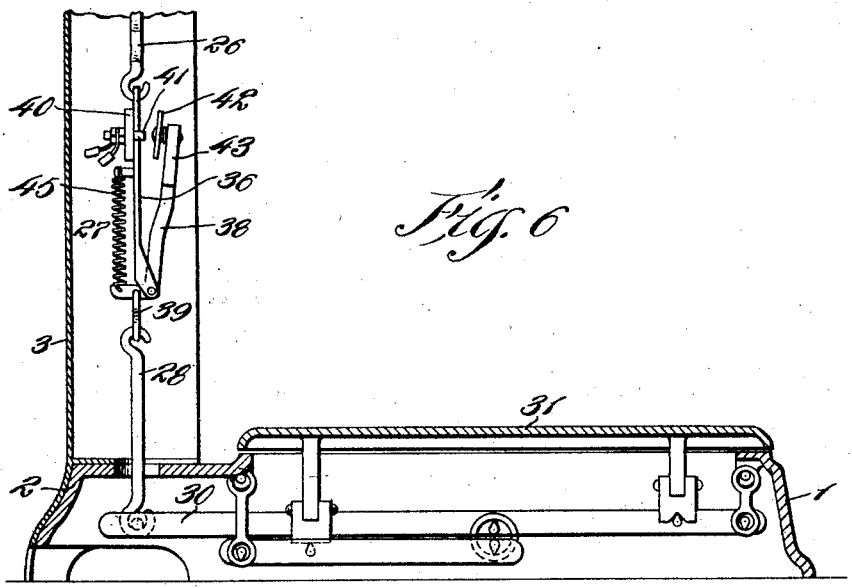
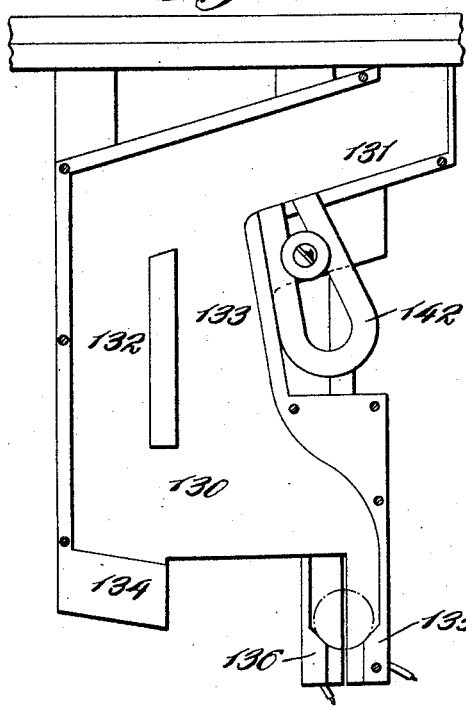
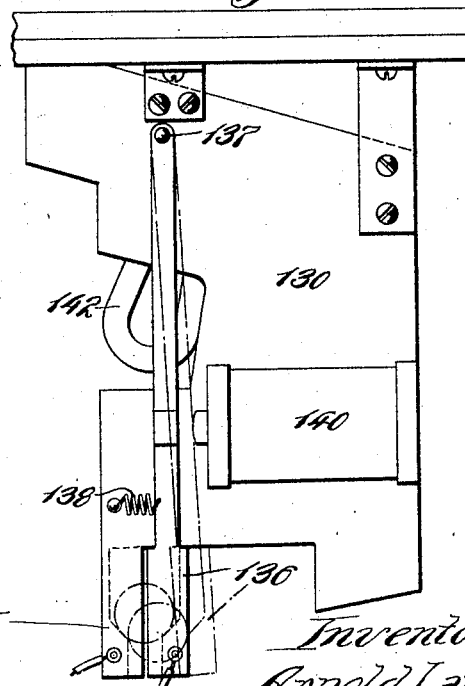
Inventor
Arnold Larsen
Hull, Smith, Brock & West

UNITED STATES PATENT OFFICE.

ARNOLD LARSEN, OF CLEVELAND, OHIO, ASSIGNOR TO THE WILLIAM GENT VENDING MACHINE COMPANY, OF CLEVELAND, OHIO, A CORPORATION OF OHIO.

WEIGHING MACHINE.

1,412,184.  Specification of Letters Patent.  Patented Apr. 11, 1922.

Application filed June 20, 1918. Serial No. 240,922.

*To all whom it may concern:*

Be it known that I, ARNOLD LARSEN, a subject of the King of Norway, residing at Cleveland, in the county of Cuyahoga and State of Ohio, have invented a certain new and useful Improvement in Weighing Machines, of which the following is a full, clear, and exact description, reference being had to the accompanying drawings.

This invention relates to weighing machines of the class disclosed in my former application Serial No. 876,423, filed December 10, 1914, and has to do with improvements on my former machine, although some of its features are of broader adaptability.

In my former construction, when a load was placed upon the load supporting member or platform the operation of the electrical apparatus involved in the machine was initiated, and if nothing more was done, as the insertion of coin, current would continue to flow until the load was removed, and this resulted at times in a waste of current if an object were carelessly left on the platform. Also, it was necessary to depress the platform or load supporting member before inserting the coin, for otherwise the coin would pass freely through the coin chute and be returned to the operator, the temporary holding means for the coin being dependent for its operation upon the depression of the load supporting member.

In my former machine the heavy weight was moved intermittently through successive positions on its beam, the weight being required to dwell at each position for a brief space of time to give the scale beam an opportunity to tilt if the heavy weight were overbalanced by the load, so that the operation of the heavy weight consumed considerable time; and at each position there was a breaking and making of an electrical circuit through a pair of contact points, and this continual use of the points resulted in their rapid deterioration. Also, in instances where the current was comparatively strong, the light weight was apt to travel so fast that its momentum would carry it beyond balancing position, and cause trouble in the operation of the machine.

It is the objects of my present invention to overcome the foregoing and other more or less undesirable features by providing a construction which is rendered operative by the joint acts of placing a load upon the load supporting member and the insertion of a coin, but which remains inoperative until both acts are performed; wherein a coin may be inserted, prior to placing the load upon the load supporting member, and retained in correct position to assist in the operation of the machine when the load is deposited on the load supporting member wherein the platform or load supporting member may be depressed in the absence of a coin, without establishing an electric circuit; to provide an arrangement whereby the movement of the heavy weight is rendered substantially continuous until it reaches a position where it is overbalanced by the load; and wherein means are provided for regulating the speed of the light-weight so that the machine may be adjusted in this respect to fit varying current conditions.

Further objects will become apparent as I proceed to describe my present construction, among them being a simple adjustment through which the effective value of one of the balancing weights may be conveniently altered without having to load the weight; and the provision of means for accomplishing a quick break of the circuit which controls the movements of the heavy weight.

The several objects of my present invention are attained in the construction illustrated in the drawings accompanying and forming a part hereof and wherein Fig. 1 is a sectional front elevation of my improved machine; Fig. 2 is a sectional plan on the line 2—2 of Fig. 1; Fig. 3 is a transverse vertical section on the correspondingly numbered line of Fig. 1; Fig. 4 is a sectional rear elevation of the head of the machine, the same being somewhat enlarged over Fig. 1; Fig. 5 is a right hand end elevation of the head; Fig. 6 is a central vertical section through the platform or load supporting member and parts associated therewith, and includes the switch controlled by the platform; Figs. 7 and 8 are details of the coin chute; Fig. 9 is a wiring diagram of the machine; and Fig. 10 is a sectional detail of the heavy weight, showing its adjustment.

I have taken as a basis for my present construction a standard type of platform scale, redesigned to fit the requirements of my invention. This scale is made up, generally, of a base 1 from an extension 2 of which rises a column or pedestal 3, broadened out at its upper end to form a head as shown at 4, that is surmounted by a plate 5. A branched scale beam, designated generally 8, is pivoted at 9 to a forked bracket 10 that rises from the plate 5, the beam comprising branches 12 and 13, the outer ends of the branches being connected by a bar 14 having a projection 15 which extends through an opening in a loop 16, rising from the plate 5 near its right hand end, as viewed in Fig. 1.

Left of its pivotal support 9, the beam has articulated to it a clevis 18 through the lower end of which is engaged a hook 19 that extends downward through an opening in the plate 5 where its lower end is connected through a clevis 20 with one end of a lever 22. The opposite end of the lever has pivotal connection at 23 with a hanger 24, depending from the underneath side of the plate 5. At a point substantially central of the column 3, the lever 22 has connected to it a clevis 25 through which is engaged the hooked upper end of a rod 26 that depends within the column and has connection, through the intervention of what I shall term the platform switch, designated generally 27, with a rod 28 the whole constituting, in effect, a direct connection between the lever 22, and a member 30 that forms a part of the leverage arrangement which sustains the load supporting member or platform 31. All of this, with the exception of the platform switch 27, is common practice and is described in my former application above referred to, wherefore it is deemed unnecessary to describe here.

From Figs. 1 and 6, it will be seen that the platform switch 27 comprises a plate 36 that has its upper end connected to the rod 26, and to the lower end of which is pivoted an L-shaped lever 38 having its horizontal branch connected, through the hook 39 to the upper end of the rod 28. Adjacent its upper end, the plate 36 has fastened to it a block of insulating material 40 carrying two carbon contact points 41, adapted to be bridged by a metal disk 42 that is yieldingly carried, through the intervention of a piece of insulating material 43, by the upper end of the L-shaped lever 38, when said lever is swung under the influence of a load placed upon the platform and acting to depress or draw down upon the rod 28. This action of the L-shaped lever is resisted by a comparatively light spring 45 which serves nominally to maintain a separation of the contact points 41 and disk 42 through an elevation of the horizontal branch of the lever.

What I shall term the "light weight" 48 is slidable along the branch 12 of the scale beam, this beam being graduated according to prevailing practice; and a "heavy weight" 50 is slidable along the lower branch 13, the latter weight having anti-friction rollers 51 that traverse the upper edge of the beam. It will be observed that the upper edge of the branch 13 is notched at regular intervals, the notches occurring at points representing, in the present case, 50 pound graduations, so that a shifting of the heavy weight from one to the other of adjacent notches effects a difference of fifty pounds in the weights thus registered. And in this connection it may be pointed out that the capacity of the upper branch 12 is 50 pounds.

Supported by and between bracket 10 and loop 16, to the rear of the scale beam, is a frame 54 comprising upper and lower rails 55 and 56, respectively, and a central bar 57 having notches 58 extending upward from its lower edge, there being a notch for each graduation of the lower or heavy weight scale beam. A mover is shiftable along each of the rails 55 and 56, that of the former being designated 59, and the latter, 60. The upper end of each of the weight movers is forked and a pin 61 of the light weight is received between the branches of the mover 59, while a pin 62 of the heavy weight reposes between the branches of the mover 60. When either of the movers is shifted along its respective rail, the weight associated with it will be moved along its beam. The weight movers are shifted by mechanism which I shall now describe.

To the mover 59 is connected the ends of a flexible element 64, such as a cable. This element is guided over sheaves 65, 66, and 67, that are disposed upon the frame 54 in such a way as to provide a portion that is carried downward through an opening in the plate 5 to where it is attached to a drum 68 (see Fig. 3), fixed to a shaft 69 that is journalled within a bracket 70, suspended from the plate 5. Whether the element 64 is a continuous piece, or is made up of separate pieces extending from the drum to the mover, is immaterial. Upon rotation of the drum, a part of the flexible element will be accumulated upon the drum while another part is being paid out, thereby to shift the mover 59 along its rail 55, and consequently the light weight 48 along the upper branch of the scale beam. A second flexible element or cable 72 is led from the right hand end of the mover 59, (as viewed in Fig. 4), over a sheave 67, sheave 73 that is situated below the drum 68 and journalled upon a stud 74 which is carried by the shell of the head 4, and thence over a similarly supported sheave 75, located above the column 3 and from which the element or cable depends, the end of the element having attached to it a weight 76. By means of this weight, the mover 59 is returned to and normally maintained in the position shown in the drawings.

A flexible and, in effect, a continuous element or cable 78, connected to the weight mover 60, is trained about sheaves 79 and 80 (the latter being a three-part sheave, as shown in Fig. 5) in such a way as to provide a portion that is passed downward through an opening in the plate 5, where it is attached to a drum 81, fixed to a shaft 82 that is journalled in a bracket 83 carried by the underneath side of the plate 5, identical with the arrangement described in connection with the former drum 68. Rotation of the drum 81 in one direction effects a movement of the mover 60 along its rail 56 from normal position toward the right, as viewed in Fig. 4; and the mover is adapted to be returned to normal position, when released, by a weight 84 that is suspended from the lower end of a flexible element or cable 85, that passes up and over the sheaves 86 and 87, and over one of the parts of sheave 80 to the mover 60. To prevent undue swinging of the weights 76 and 84 when the machine is moved, they are preferably guided within tubes 88, vertically disposed within the pedestal 3.

Ratchet wheels 90 and 91 are secured on the forward ends of the respective drum shafts 69 and 82. Substantially midway between these ratchet wheels, an arm 92 is swingingly suspended from a bracket 93 that is carried by the plate 5. Pivotally connected to the lower end of the arm 92 are the inner ends of bars 94 and 95, the former having its outer end articulated to a link 96 that is pivoted to the core of a solenoid 97, while the remote end of bar 95 is similarly connected, through a link 98, with the core of a solenoid 99. Pivoted to the link 96 is a pawl 100 for cooperation, under certain circumstances, with the ratchet 90; while a pawl 101 is pivoted to link 98 for cooperation with ratchet 91. The ratchet engaging ends of the pawls 100 and 101 are elevated by springs 102 (shown in each instance as connected at one of their ends to the pawl and the other to the link). The extent to which the springs 102 may elevate the pawls is limited by the engagement of the inner ends of the pawls with the bars. Under normal conditions, with the solenoids 95 and 97 deenergized, the pawls 100 and 101 are beyond the scope of ratchets 90 and 91; but when either of the solenoids is energized, the pawl associated with it is drawn into contact with the teeth of the ratchet, so that the vibration of the arm 92 will effect intermittent rotation of the corresponding ratchet, and the drum associated therewith. The arm 92 is vibrated by a motor 105, shown as carried by the plate 5, and which has on its shaft a pinion 106 meshing with a gear 107 on a shaft 108 that is suitably supported adjacent the motor, the shaft 108 terminating substantially flush with the front face of the gear so as not to interfere with the operation of a pitman 109 that has one of its ends pivoted to the arm 92 and its other end journaled upon a crank pin 110 that is carried by the gear.

To prevent return movement of the ratchets 90 and 91, I provide detents 112 and 113 which are arranged to engage the respective ratchets when thrown within the scope thereof, the former detent being pivotally connected to the upper end of an arm 114, which, in turn, is pivoted to a bracket 115 depending from the plate 5, while the latter detent is likewise connected to an arm 116 pivoted to a bracket 117, also carried by plate 5. Compression springs 120, interposed between the detents and plate 5 tend to depress the detents to the extent permitted by a stop portion on each of the arms which is engaged by the underneath side of the detent, as clearly shown in Fig. 1. It follows from this that a swinging of the arms 114 and 116 in a direction away from their respective ratchets will result in a lowering of the detents into contact with the ratchet teeth, and this is effected by a solenoid 122 that is suspended from the left hand end of the plate 5, as viewed in Fig. 1. The core of the solenoid 122 is made in two sections one having connection with the arm 114, while the other is connected to an auxiliary arm 124 which has its lower end connected, through a link 125, with the free end of arm 116. Upon energization of solenoid 122, its opposed core sections are sucked inward (each being limited in its inward movement, as by a stop carried by the section), and the inward movement of the section connected to arm 114 will result in a rocking of the arm to depress the detent 112, while the inward movement of the other core section will swing the arm 124, and consequently, by reason of its connection through link 125 with arm 116, the latter arm in a direction to depress detent 113. Springs 128, connected to the arms 114 and 124, oppose the attraction of these arms by the solenoid.

In Figs. 7 and 8 I have shown in front and rear elevation, respectively, the coin chute 130 incorporated in my present machine, the same being quite similar to that employed in my former construction. The essential difference is that in the present case the coin is retained between the jaws of the coin holder by reason of the normal relation of the jaws, and is released when one of the jaws is moved by electrical means; whereas in the former case the electrical means acted to place the jaws in coin retaining condition as against their normal relation when a coin would be permitted to pass between them.

It will be seen upon referring to Fig. 7 that the chute contains an inclined branch 131 which opens, at its lower end, into two vertical branches 132 and 133. Below the former is situated the anvil 134, and the chute is open below branch 133. Opposite and slightly below the anvil 134 is situated the coin retaining jaws 135 and 136, the latter being pivoted at 137 to the body of the chute so as to swing toward and from the other jaw, the same being retained normally toward the latter jaw by a spring 138. The coin engaging portions of the jaws are formed of conductive material insulated from the rest of the structure by portions of the jaws that are composed of non-conductive material. An electro-magnet 140 is situated in such a position with respect to the jaw 136 as to attract the jaw when energized, a portion of the jaw passing in proximity to the core of the magnet and constituting the armature thereof. A permanent magnet 142 is sustained by the chute adjacent the entrance to branch 133. When a coin is inserted it travels down the inclined branch 131, its momentum carrying it over branch 133 and depositing it in branch 132. Dropping directly through branch 132, the coin strikes the upper inclined surface of the anvil 134 and bounds over the adjacent gap to the coin retaining jaws 135—136 whereby it is temporarily held. In case lead slugs or metallic disks of magnetic material are placed in the machine, my present chute acts the same as the one incorporated in my former machine. A disk of magnetic material is attracted by the permanent magnet 142 sufficiently to retard its progress and divert it into branch 133 through which it freely drops to a suitable receptacle beneath. If a lead slug enters branch 131, its momentum being unaffected by magnet 142, will carry it to branch 132 and causes it to be directed to the anvil 134; but being of a non-resilient character, the slug will not participate in the recoil of the anvil wherefore it will drop off through the gap between the anvil and the coin retaining jaws to find its place with the former spurious coin. A suitable receptacle is provided for the coins but it is omitted from the illustrations to reveal more important parts. The location of the coin chute is indicated in Fig. 1 in dot-and-dash lines, and in Figs. 2 and 4, in full lines.

The foregoing discussion has been directed to the mechanical features of the present embodiment, and before proceeding with the electrical side of the invention I may point out, in Figs. 1, 2 and 4, certain solenoids which are situated, for convenience, beneath plate 5 and suspended therefrom. These solenoids control electric switches, and will be referred to generally, as "preliminary switch" 145; "main switch" 146; and "cut-out switch" 147. Certain circuits are controlled by a switch that is actuated by a solenoid, located, for convenience, within the column 3, the same being designated generally 148; and the structure of this switch includes a dash-pot 150 which modifies the action of the solenoid. As illustrated in dotted lines in Fig. 1, the upper end of the solenoid core has attached to it the piston 151 of the dash pot, in accordance with the corresponding element of my former machine, and in the present instance an aperture 152 is made in the wall of the dash-pot cylinder slightly above the lowest position of the piston so as to be normally uncovered to permit initial escape of the air above the piston and permit rapid incipient action of the solenoid, the aperture being closed as soon as the piston rises to its zone after which the dash pot is effective as a retarding means for the solenoid core. A rheostat which governs the speed of the motor 105 is shown at 155 as carried by the wall of the head 4 of the machine.

Situated beyond the outer end of the scale beam and mounted upon plate 5 is a block 158 of insulating material containing four mercury wells within the respective ones of which is arranged to rise and fall with the scale beam, one of the points 159 that are carried by a bar 160, connected to but insulated from the beam. One of the points is adjustable within the bar, as by being threaded through the same, and is distinguished from the others of the series by adding exponent $a$ to its reference numeral. Thus a switch is constituted which I shall hereinafter refer to as switch A; and a similar switch B is located adjacent the opposite end of the scale beam and comprises a block 162 of insulating material having mercury wells within which extend points 163 that are connected to but insulated from the scale beam.

Extending along plate 5 beneath the frame 54 is a bar 165 of insulating material having exposed, through its upper surface, two series of contact points, those of one series being designated 166, and those of the other 167, the points being arranged in pairs consisting, respectively, of one of each series; and a spring depressed shoe 168 of conductive material is carried, and adapted to be slid, by weight mover 60 as it travels along its rail 56, the shoe being of such scope as to bridge the contact points of the respective pairs at it passes thereover. When the parts are in normal condition, the shoe reposes above and bridges one contact point of the first pair and a special contact point 170.

For brevity, and for clearness as well, I shall describe the operation of the machine in connection with the wiring diagram of Fig. 9. The source of power is represented by the positive and negative sides of a main line 170. One side of the line the positive for example, has connection through conductor 171 with one side of the platform switch 27, the other side of the switch having connection, through conductors 172 and 173 with jaw 135 of the coin retainer. The other jaw 136 has connection, through the conductor 174, with the solenoid winding of the preliminary switch 145, this conductor including also one point 175 of a three-point switch, the other points being designated 176 and 177, all of which are adapted to be bridged by a disk 178 of conductive material, such as copper, that is carried by the core of the solenoid, when the core is sucked inward. The opposite end of the solenoid winding of the preliminary switch has connection through conductor 179 with one point of switch A, while another point of the latter switch has connection through conductor 180 with the opposite or negative side of the line. Assuming that a coin is sustained by the coin retaining jaws to make contact between them, and a load has been deposited upon the load supporting member or platform of the machine to close the platform switch, it will be seen, from the foregoing, that a circuit is established to actuate the preliminary switch, it being understood of course that switch A is normally closed on account of the normally depressed condition of the scale beam. The solenoid of the preliminary switch thus being energized will close contact between points 175, 176 and 177 resulting in a part of the current introduced through conductor 174 being diverted through conductor 182 to one side of the winding of the solenoid incorporated in the main switch 146, the conductor leading also to one of the three-points 184, 185 and 186 of the main switch, these points being adapted to be bridged by the disk 188 that is carried by the main switch solenoid core. The opposite side of the latter solenoid has connection, through conductor 190 and former conductor 180, with the negative side of the circuit. Before leaving the preliminary switch, it may be explained that its third point 177 has connection through conductor 192 with one side of the solenoid of cut-out switch 147, the opposite side whereof is connected through the conductor 193 with the mercury well of switch A into which the adjustable point 159ª dips, the current returning through this well, the point 159ª and the adjacent point 159, to the negative side of the circuit through conductor 180. The disk or bridge member 195 that is carried by the core of the cut-out switch solenoid is adapted to bridge an upper pair of contact points 196 when the solenoid is energized, or a lower pair 197 when de-energized. The governor switch 148 is likewise adapted to make contact between an upper pair of contact points 200, when the solenoid is energized, and between a lower pair of contact points 201, when de-energized. A branch 202 leads from conductor 192 to one of the points 201, while the other has electrical connection through conductor 203 with one side of the previously mentioned solenoid 99 (which controls transmission of power to the heavy weight drum) while the opposite side of the solenoid is connected, through conductor 204, with former conductor 179 that leads to switch A, the return path for the current from switch A to the line having been previously set forth. The establishment of a circuit including solenoid 99 results in the elevation of pawl 101 so that upon operation of the electric motor 105, the heavy weight drum will be rotated to move the heavy weight 50. Upon actuation of the platform switch 27, the current is led from conductor 172, through conductor 186ª to point 186 of the main switch, thence through the bridge member 188 of said switch, through conductor 206, from point 185 of the main switch, to one side of the motor 105. From the opposite side of the motor the current, taking the course of least resistance, passes through conductor 207, points 196, plate 195, conductor 208, to switch A, from which it returns to the line. A part of the current, however, is diverted through conductor 210, leading from conductor 206, through the winding of magnet 140 (associated with the coin retainer) through conductor 211, to point 170, thence through shoe 168, to adjacent point 166, from which it returns through conductor 212 to former conductor 179 which leads to switch A, and through said switch to the line. Thus the jaw 136 will be moved to release the coin, the presence of the coin between the sides of the switch represented by the jaws 135 and 136 being no longer necessary, since the main switch is closed. Through a conductor 214, which has connection with conductor 206, a part of the current is diverted through the solenoid 122 that controls detents 112 and 113, as previously explained, the current returning to the opposite side of the line through conductors 215 and 190.

Reviewing in a general way the foregoing operation, it will be seen that upon an insertion of a coin in the machine and the deposit of a load on the load-supporting member or platform, the motor 105 is almost instantly set in operation; the pawl 101 is elevated into contact with the ratchet 91 so that the vibrations of the arm 92, produced by the motor, will be transmitted through the bar 95 to the drum 81, and through the flexible element or cable 78 to the mover 60 so that the heavy weight 50 will be slid inward along the lower branch 30 of the scale beam; and the detent 113 is lowered into contact with the ratchet 91 for the purpose of preventing backward movement of the ratchet. Immediately after the start of the weight 50, the shoe 168 is removed from contact point 170 to open the circuit including the magnet 140 so that it is deenergized and remains so throughout the rest of the operation. The purpose of the governor switch 148 is to momentarily break a circuit made by the bridging of a pair of the contact points 166 and 167 when over run and thus bridged by the shoe 168, resulting, as will be evident from the description to follow, in an interruption in the travel of the weight mover 60, the interruption occurring, it may be explained, when the pin 62 is directly beneath one of the notches 58 in the bar or plate 57 so that, if the weight on the platform overbalances the heavy weight 50, the weight may rise with its pin 62 within the notch. The solenoid of the governor switch is in the circuit introduced from point 177 of the preliminary switch through conductor 192, a branch 218 which connects with one end of the solenoid winding, a conductor 219 which leads from the opposite end of said winding to one of the contact points of pair 197, the other contact of the pair having connection through conductor 220 with the series of contact points 167. It will be recalled, however, that the connection between the points of the pair 197, is broken by reason of the elevation of the member 195 carried by the core of the now energized solenoid of the cut-out switch 147 so that, at the present time, the governor remains inoperative and the flow of current through the contact points of the pair 201 remains constant, wherefore the heavy weight will move without hesitation across the successive pairs of contact points 166 and 167 until said weight reaches a position where it is overbalanced by the load. When it reaches such a position, the outer end of the scale beam rises to remove points 159 and 159ª from the mercury wells which constitute switch A thus breaking the other connections made through this switch, while establishing other connections through switch B by reason of the depression of the points 163 into the mercury wells of the latter switch. Before leaving this phase of the operation, attention is called to a lever 225 that is pivoted to one side of the loop 16 and extends transversely thereof beneath the extension 15 of the scale beam. A light spring 226, that is anchored at its upper end to the loop and at its other end is connected to the free end of the lever 225, tends to elevate the scale beam just before the weight 50 reaches the position whereat it is permitted to rise because of the presence of one of the notches 58, it being explained that the elevated position of bar 57 permits at any time a slight rise of the scale beam. The initial upward movement of the scale beam thus effected causes the withdrawal of the finely adjusted point 159ª from the mercury, prior to the withdrawal of the points 159, so that the circuit including the solenoid winding of the cut-out switch 147 is broken to deenergize the said solenoid and permit the cut-out switch to return to normal condition, when the contact points 197 are bridged to throw into circuit the winding of the governor switch solenoid. As a result of this, when the heavy weight does reach a position where it is permitted to rise, with the shoe 168 of its mover 60 bridging the adjacent pair of contact points of the series 166 and 167, the governor switch will be actuated to remove its bridge member 228 from the pair of contact points 201, and, after a slight interval, establish contact between the points of the pair 200 which are included in the same circuit as the contact points 201, one of the contact points 200 having connection with conductor 192 through branch 229, while the other point has connection, through branch 230, with conductor 203. While the upper set of contact points are bridged the weight mover 60 will be urged forward sufficiently to withdraw its shoe from one of the contacts wherewith it cooperates and open the circuit to the governor solenoid, deenergizing it and allowing the governor to return to normal condition. As previously stated, the interval of time during which the circuit is interrupted is governed by the dashpot 150, constituted to make a quick break between points 201. By reason of this break in the circuit which controls the movement of the weight 50, sufficient time is afforded for the pin 62 of the weight to rise within the adjacent notch 58.

Assuming that the heavy weight is overbalanced by the load and the scale beam is elevated to break connections through switch A, while the opposite end of the beam descends to render effective the switch B, the current will flow from the motor through conductor 207, rheostat 155 (connection between the contact points of pair 196 being broken by reason of the withdrawal of plate 195) conductors 208 and 240, to switch B, and thence through conductors 241 and 180, to the negative side of the line. The motor 105 will now continue to operate, its speed being governed by the adjustment of the rheostat, to move the light weight along its beam, a part of the current being diverted from conductor 206 through conductor 242, the winding of solenoid 97 (which acts to render effective the connections between the motor and the light weight drum) the circuit including the solenoid 97 being completed through conductor 243, switch B, and former conductors 241 and 180. So long as the main switch is maintained closed, current will continue to flow through the winding of the detent solenoid 122, as previously explained, and inasmuch as the winding of the main switch is in a circuit independent of the switches A and B, but including the platform switch 36, the heavy and light weight drums will be held against return movement, and consequently the balancing weights against retraction to their initial positions. When, however, the load is removed from the platform or load supporting member, the main switch solenoid will be deenergized to permit said switch to open and break the circuit of the detent solenoid so that the drums are released, allowing weights 76 and 84 to retract the balancing weights.

The adjustment hereinbefore referred to for altering the effective value of the heavy weight, is illustrated in Fig. 10. The weight has threaded transverse bore 250 within which is screwed a plug 251 constituting an auxiliary weight. It will be observed that the bore extends substantially in the direction of the scale beam, so that by shifting the auxiliary weight 251, it will vary the depressing effect of the weight upon the beam. A set screw 252 (Fig. 1) is threaded through the side of the weight 50 for engagement with the auxiliary weight to lock lock the latter in place. The foregoing embodiment is merely illustrative of this feature of my invention for it is obvious that it is susceptible to many modifications and employment in different types of scales.

Having thus described my invention what I claim is:

1. In a weighing machine, the combination of a load supporting member, a scale beam operatively connected thereto, a weight movable along the beam through successive positions from the outer toward the inner end of the beam, means preventing the beam tilting except when the weight occupies one of said positions, means for moving the weight along the beam, governing means arranged to suspend operation of the weight moving means when the weight is in any one of the aforesaid positions, and further means for maintaining the governing means inoperative until the weight arrives at a position where it is overcome by the load.

2. In a weighing machine, the combination of a load supporting member, a scale beam operatively connected thereto, a weight movable along the beam through successive positions from the outer toward the inner end of the beam, means limiting the elevation of the beam to an incipient rise only, except when the weight occupies one of said positions, means for moving the weight along the beam, governing means arranged to suspend operation of the weight moving means when the weight is in any one of the aforesaid positions, and further means acting to maintain the governing means inoperative and which is rendered ineffective upon an incipient rise of the beam.

3. In a weighing machine, the combination of a load supporting member, a scale beam operatively connected thereto, a weight movable along the beam through successive positions from the outer toward the inner end of the beam, means restraining the beam against any but a comparatively slight rise except when the weight occupies one of said positions, means for moving the weight along the beam, governing means arranged to suspend operation of the weight moving means when the weight is in any one of the aforesaid positions, means tending to tilt the beam, the same becoming effective as the weight approaches a position where it is overcome by the load, and further means acting to maintain the governing means inoperative and which is rendered ineffective upon an incipient rise of the beam.

4. In a weighing machine, the combination of a load supporting member, a scale beam operatively connected thereto, a weight movable along the beam through successive positions from the outer toward the inner end of the beam, electric mechanism for so moving the weight and involving a weight mover, a series of pairs of contact points, the weight mover carrying a bridge member arranged to bridge the contact points of the successive pairs of the series as the weight occupies the aforesaid successive positions, an electric circuit including the weight moving mechanism, an interrupter in said circuit, electromagnetic means for actuating the interrupter, a circuit including said electromagnetic means and the opposed contact points of the aforesaid series, a switch in the last mentioned circuit, electromagnetic means acting when energized to open the switch, a circuit including the last mentioned electromagnetic means, and a switch in the last mentioned circuit that is opened upon an incipient rise of the scale beam.

5. In a weighing machine, the combination of a load supporting member, a scale beam operatively connected thereto, a weight movable along the beam through successive positions from the outer toward the inner end of the beam, electrical mechanism for so moving the weight and involving a bridge member that is movable in unison with the weight, a series of pairs of contact points, the aforesaid bridge member being arranged to bridge the contact points of the successive pairs of the series as the weight occupies the aforesaid successive positions, an electric circuit including the weight moving mechanism, an interrupter in said circuit, electromagnetic means for actuating the interrupter, a circuit including said electromagnetic means and the opposed contact points of the aforesaid series, a switch in the last mentioned circuit, electromagnetic means acting when energized to open the switch, a circuit including the last mentioned electromagnetic means, and a switch in the last mentioned circuit, said switch comprising two relatively movable elements, one being carried by the scale beam and the other supported in operative relation to the first, one of said elements being adjustable.

6. In a weighing machine, the combination of a load supporting member, a scale beam operatively connected thereto, a weight movable along the beam through successive positions from the outer toward the inner end of the beam, electrical mechanism for so moving the weight, a series of pairs of contact points, a bridge member incorporated in the weight moving mechanism and arranged to bridge the contact points of the successive pairs of the series as the weight occupies the aforesaid successive positions, an electric circuit including the weight moving mechanism, an interrupter in said circuit, electromagnetic means for actuating the interrupter, a circuit including said electromagnetic means and the opposed contact points of the aforesaid series, a switch in the last mentioned circuit, electromagnetic means acting when energized to open the switch, a circuit including the last mentioned electromagnetic means, and a switch in the last mentioned circuit, said switch comprising two relatively movable elements, one carried by the scale beam and the other supported in operative relation thereto.

7. In a weighing machine, the combination of a load supporting member, a scale beam operatively connected thereto, a weight movable along the beam through successive positions from the outer toward the inner end of the beam, electrical mechanism for so moving the weight, a series of pairs of contact points, a bridge member incorporated in the weight moving mechanism and arranged to bridge the contact points of the successive pairs of the series as the weight occupies the aforesaid successive positions, an electric circuit including the weight moving mechanism, an interrupter in said circuit, electromagnetic means for actuating the interrupter, a circuit including said electromagnetic means and the opposed contact points of the aforesaid series, a switch in the last mentioned circuit, electromagnetic means acting when energized to open the switch, a circuit including the last mentioned electromagnetic means, and a switch in the last mentioned circuit, said switch comprising a pair of mercury wells supported adjacent the scale beam and a pair of points carried by the beam and operating within the mercury wells, one of said points being adjustable to vary its elevation.

8. In a weighing machine, the combination of a load supporting member, a scale beam operatively connected thereto, a weight movable along the beam through successive positions from the outer toward the inner end of the beam, mechanism for so moving the weight, governing means arranged to suspend operation of the weight moving mechanism when the weight occupies any one of the aforesaid positions, electromagnetic means acting when energized to render the governing means inoperative, a circuit including the electromagnetic means, and a switch in the last mentioned circuit, said switch comprising two relatively movable elements, one carried by the scale beam and the other supported in operative relation to the first.

9. In a weighing machine, the combination of a load supporting member, and scale beam operatively connected thereto, a weight movable along said beam, electrical mechanism for moving the weight from normal position to a position where it is overcome by the load, an actuating circuit for said mechanism, a switch included in said circuit controlled by the movement of the scale beam, a main switch in said circuit, a second circuit, a preliminary switch therein for actuating the main switch, the second circuit including the load supporting member, a coin retaining means in the second circuit, a third circuit closed by the preliminary switch, electromagnetic means within the third circuit for rendering the coin retaining means ineffective, and a switch included in the third circuit that is opened upon the movement of the weight from normal position.

10. In a weighing machine, the combination of a load supporting member, a scale beam operatively connected thereto, a weight movable along the beam, a coin retaining device, means for moving the weight along the beam, means controlling the weight moving means and including the coin retaining device and the load supporting member, and means rendered effective upon the actuation of the weight moving means for releasing the coin, the same resuming ineffective condition upon movement of the weight from normal position.

11. In a weighing machine, the combination of a load supporting member, a scale beam operatively connected thereto, a weight movable along said beam, mechanism for so moving the weight, a coin retaining device, means for rendering the weight moving mechanism operative and including the load supporting member and the coin retaining device, and means for actuating the coin retaining means to release the coin upon initial operation of the weight moving mechanism.

12. In a weighing machine, the combination of a load supporting member, a branched scale beam operatively connected thereto, a weight movable along each branch, one of said weights normally reposing at the inner end and the other at the outer end of their respective branches, the latter normally maintaining the outer end of the beam depressed, an electric motor, operative connections between the motor and the weights for moving the weights along their beams, said connections being rendered ineffective when the beam is in balancing position, an electric circuit including the motor and maintained closed by the depression of the outer end of the scale beam, and a second circuit also including the motor and maintained closed by the elevation of the outer end of the scale beam, and means included in the last mentioned circuit for controlling the speed of the motor.

13. In a weighing machine, the combination of a load supporting member, a branched scale beam operatively connected thereto, a weight movable along each branch, one of said weights normally reposing at the inner end and the other at the outer end of their respective branches, the latter normally maintaining the outer end of the beam depressed, an electric motor, operative connections between the motor and the weight reposing at the outer end of its beam branch said connections being rendered ineffective by the rise of the beam, operative connections between the motor and the other weight, said connections being rendered effective by the rise of the beam, all said connections being rendered ineffective when the beam is in balancing position, an electric circuit including the motor and maintained closed by the depression of the outer end of the scale beam, and a second circuit also including the motor and maintained closed by the elevation of the outer end of the scale beam, and means included in the last mentioned circuit for varying the voltage of the current through the motor.

14. In a weighing machine, the combination of a load supporting member, a scale beam operatively connected thereto, a weight movable along the beam through successive positions from the outer toward the inner end of the beam, means preventing the beam rising except when the weight is in one of said positions, electrical mechanism for moving the weight, an actuating circuit for said mechanism, an interrupter in said circuit comprising opposed pairs of contact points, the contact points of each pair being included in the circuit, a bridge member movable from one pair of contact points to the other electromagnetic means arranged to so move said bridge member when the weight occupies any one of the aforesaid positions, and means for governing the movement of the bridge member, said means consisting of a dash pot cylinder and a piston therein, one of said elements being operatively connected to the bridge member while the other is supported in operative relation to the first element, the cylinder having a vent through which fluid contained therein may escape upon initial movement of the piston but which is thereafter closed to retard the movement of the piston.

15. In a weighing machine, the combination of a load supporting member, a scale beam operatively connected thereto, a weight movable along the beam through successive positions from the outer toward the inner end of the beam, means preventing the beam rising except when the weight is in one of said positions, electrical mechanism for moving the weight, an actuating circuit for said mechanism, an interrupter in said circuit comprising opposed pairs of contact points, the contact points of each pair being included in the circuit, a bridge member movable from one pair of contact points to the other means arranged to so move said bridge member when the weight occupies any one of the aforesaid positions, and means for governing the movement of the bridge member and acting to permit rapid initial movement of said bridge member while retarding further movement thereof.

In testimony whereof, I hereunto affix my signature.

ARNOLD LARSEN.